(12) United States Patent
Sperger et al.

(10) Patent No.: US 6,174,592 B1
(45) Date of Patent: Jan. 16, 2001

(54) COMPOSITE GLASS AND METHOD FOR PRODUCING A COATED PLASTIC FOIL, PREFERABLY THEREFOR

(75) Inventors: Reinhard Sperger, Feldkirch (AT); Peter Bluher, Oberhaching; Hartmut Zarfl, Munich, both of (DE)

(73) Assignees: Balzers Hochvakuum AQ, Trübbach (CH); Bayerische Motoren Werke Aktiengesellschaft, München (DE)

( * ) Notice: Under 35 U.S.C. 154(b), the term of this patent shall be extended for 0 days.

(21) Appl. No.: 09/111,539

(22) Filed: Jul. 8, 1998

(30) Foreign Application Priority Data

Jun. 19, 1998 (AT) .................................................. 1322/98

(51) Int. Cl.[7] .............................. B32B 17/04; B32B 17/10
(52) U.S. Cl. .......................... 428/212; 428/426; 428/428; 428/430; 428/432; 428/436; 428/437; 428/480; 428/524; 428/698; 428/701; 428/702; 204/192.1; 204/192.11; 204/192.26; 204/192.14
(58) Field of Search ..................... 428/212, 426, 428/428, 432, 450, 430, 698, 699, 701, 702, 436, 437, 480, 524; 359/359, 580; 204/192.1, 192.11, 192.26, 192.14

(56) References Cited

U.S. PATENT DOCUMENTS

| 4,581,280 | * | 4/1986 | Taguchi et al. | 428/212 |
|---|---|---|---|---|
| 4,965,121 | * | 10/1990 | Young et al. | 428/213 |
| 4,973,511 | * | 11/1990 | Farmer et al. | 428/216 |
| 5,073,451 | * | 12/1991 | Iida et al. | 428/336 |
| 5,143,796 | * | 9/1992 | Sebastiano et al. | 428/623 |
| 5,473,468 | * | 12/1995 | Rudigier et al. | 359/359 |
| 5,780,149 | * | 7/1998 | McCurdy et al. | 428/336 |
| 5,935,702 | * | 8/1999 | Macquart et al. | 428/336 |
| 5,965,246 | * | 10/1999 | Guiselin et al. | 428/212 |

FOREIGN PATENT DOCUMENTS

| 4024308 | 2/1991 | (DE) . |
|---|---|---|
| 3941796 | 6/1991 | (DE) . |
| 1313190 | 11/1962 | (FR) . |
| 9002653 | 3/1990 | (WO) . |

OTHER PUBLICATIONS

Thin Solid Films—2194, 193/194 (1990) Dec. 15, Nos. 1/2, Lausanne, CH *Window Coatings for the Future*, C.G. Granqvist.

* cited by examiner

*Primary Examiner*—Timothy M. Speer
*Assistant Examiner*—Stephen Stein
(74) *Attorney, Agent, or Firm*—Notaro & Michalos P.C.

(57) ABSTRACT

A compound glass arrangement comprises between two glass layers (5a, 5b) and embedded between two foils (3) a layer carrier foil (1). On the carrier foil (1) there is provided a coating (2) which is exclusively dielectric. It has a maximum of reflection for light in the near infrared spectral range and a transmission maximum for light in the visible spectral range.

25 Claims, 4 Drawing Sheets

COMPOSITE GLASS AND METHOD FOR PRODUCING A COATED PLASTIC FOIL, PREFERABLY THEREFOR

FIELD AND BACKGROUND OF THE INVENTION

The present invention is directed on a composite glass and to a method for producing a coated plastic foil, thereby preferably to be used for such composite glass.

At first, some entities shall be defined:

Visible light range:
  Spectral range between 380 nm and 780 nm.
Sunlight:
  Spectral range between 200 nm and 2500 nm.
Near infrared:
  Spectral range between 780 nm and 1200 nm.
Reflection coefficient $R_{VIS}$:
  With the spectral sensitivity to luminosity of the human eye weighted ratio of reflected and impinging light:

$$R_{vis} = \frac{\int_{380\ nm}^{780\ nm} R(\lambda)V(\lambda)S(\lambda)d\lambda}{\int_{380\ nm}^{780\ nm} V(\lambda)S(\lambda)d\lambda}$$

wherein:
  $R(\lambda)$ is the reflection value at a specific wavelength $\lambda$
  $V(\lambda)$ is the spectral sensitivity to luminosity of the human eye
  $S(\lambda)$ is the spectral radiation distribution of standard light D65 (color temperature 6500K).
Transmission coefficient $T_{VIS}$:
  With the spectral sensitivity to luminosity of the human eye weighted ratio between transmitted and impinging light:

$$T_{vis} = \frac{\int_{380\ nm}^{780\ nm} T(\lambda)V(\lambda)S(\lambda)d\lambda}{\int_{380\ nm}^{780\ nm} V(\lambda)S(\lambda)d\lambda}$$

wherein there is further valid:
  $T(\lambda)$ Transmission value at a specific wave length $\lambda$,
Transmission coefficient $T_{SUN}$:
  With the spectral radiation distribution of the sun weighted ratio of transmitted light and impinging light:

$$T_{SUN} = \frac{\int_{200\ nm}^{2500\ nm} T(\lambda)S_s(\lambda)d\lambda}{\int_{200\ nm}^{2500\ nm} S_s(\lambda)d\lambda}$$

wherein there is valid:
  $S_S(\lambda)$ spectral distribution of the sun radiation.
Reflection coefficient $R_{SUN}$:
  With spectral radiation distribution of the sun weighted ratio of reflected light and impinging light:

$$R_{SUN} = \frac{\int_{200\ nm}^{2500\ nm} R(\lambda)S_s(\lambda)d\lambda}{\int_{200\ nm}^{2500\ nm} S_s(\lambda)d\lambda}$$

Absorption $A_{SUN}$:

$$A_{SUN} = \frac{\int_{200\ nm}^{2500\ nm} A(\lambda)S_s(\lambda)d\lambda}{\int_{200\ nm}^{2500\ nm} S_s(\lambda)d\lambda}$$

wherein there is valid:
  $A(\lambda)$ the absorption value at a specific wave length $\lambda$.
Sun heat-up specification value.

$$E_{SUN}=T_{SUN}+A_{SUN}/2$$

The smaller $E_{SUN}$ of a sun radiation protection system becomes the better is its protection ability.

The minimum value possible for $E_{SUN}$ for car windows is given by the fact that within the visible spectral range a minimum transmission is required, e.g. of 75% for front screens of cars according to ECE Standard No. 43. $E_{min,\ SUN}$ is defined by the so-called "ideal glass". It has within the visible spectral range a constant required transmission of e.g. 75% according to a constant absorption of 25% and further features in the ultraviolet spectral range ($\lambda<380$ nm) as well as in the infrared range ($\lambda>780$ nm) a constant reflection of 100%. Thereby, a maximum sun protection ability would be reached and simultaneously the standard of 75% transmission in the visible spectral range would be fulfilled.

Figure 1:
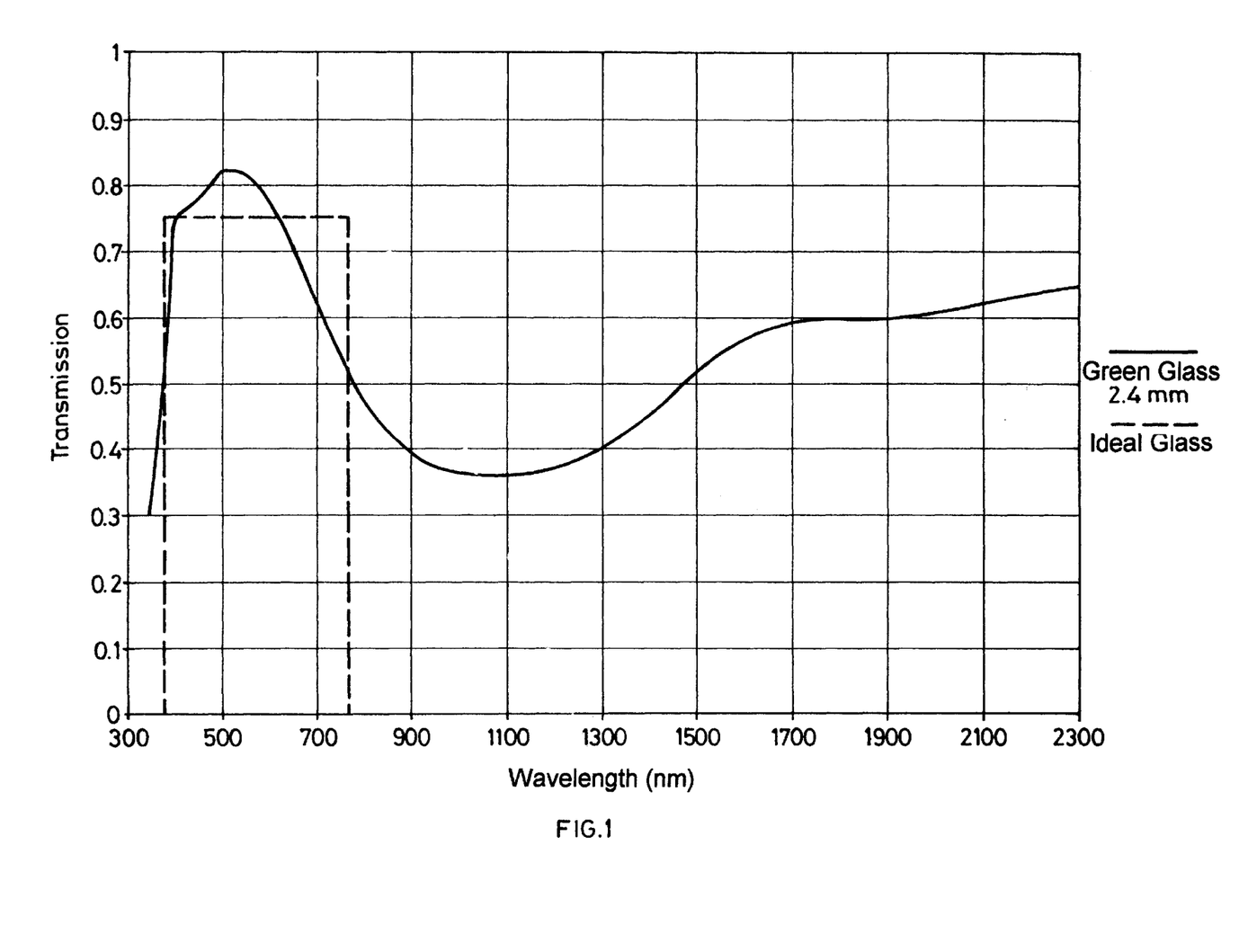
FIG. 1 is a graph plotting the spectral transmission course of green glass with a thickness of 2.4 mm and, in dotted lines, of the so-called "ideal glass", at light impinging perpendicularly.

Protection from sun radiation is realized today substantially by two approaches:

Absorbing glass, e.g. "green glass": Green glass is a colored, absorbing glass which appears in the visible spectral range and in transmission greenish. A typical transmission course for light impinging perpendicularly and considered along the entire sun light spectral range is shown in FIG. 1 (solid line) altogether with the transmission course of the ideal glass (dashed line). In dependency of the concentration of coloring and of the thickness of the glass, the absorption may be increased or lowered, but the transmission varies in the visible spectral range too as the course remains qualitatively the same.

Absorbing glass is limited with respect to its sun protection effect because it only acts via absorption, which and according to $E_{SUN}$ leads as well to heating up a room which is situated opposite to impinging sun radiation, as e.g. and especially to heating up of the interior room of a vehicle which is provided with such a sun protection system. Besides of that, the slope of the absorption edge between visible spectral range and near infrared spectral range is limited; if within the visible spectral range there is requested a minimal transmission, then the transmission in the near infrared spectral range may not be realized infinitely low.

So-called D/M/D layer systems (dielectric layer/metal layer/dielectric layer) which are deposited either on glass substrates, as e.g. and especially on car window glass directly or on a foil, mostly on a polyester foil, which latter is subsequently embedded into a composite glass. Thereby, the plastic foil provided with the coating is typically assembled to a composite glass via a polyvinylbutyral-PVB-foil. As typical dielectric layer materials oxides of Zn, Ti, In etc. are used, as metal layer especially silver.

Thereby, it is known that silver is best suited to effectively separate light within the visible spectral range from light in the infrared spectral range. Due to its optical constants, namely refractive index n and extinction coefficient k, silver allows for a high transmission in the visible spectral range and for a high reflection in the near infrared spectral range. Attention is led thereabout on (1) H. A. Macleod, "Thin Film Optical Filter", Second Edition, Adam Hilger Ltd.; pp 292.

Equally known is nevertheless that silver is most sensitive to influences from the surrounding, as to humidity, formation of silver sulphide etc., and this irrespective whether such layer system is deposited on glass or on a plastic foil. Thereabout, attention is drawn to the following literature:

U.S. Pat. No. 5,532,062: ZnO/Ag/ZnO; for improving resistance against surrounding Zn, ZnO respectively is doped (e.g. with Si, Ti, Cr, . . . )

U.S. Pat. No. 5,320,893: D/M/D; here a protection system is "sealed" by means of a specific glass compound technique and in thereby protected with respect to surrounding.

U.S. Pat. No. 5,510,173: D/M/D; to increase resistance of a protective system with respect to the surrounding the system is modified to a D/M/DD (typically indium oxide/Ag/indium oxide/indium tin oxide)

DE 30 27 356: D/M/D; to increase resistance with respect to the surrounding the dielectric layers of a protecting system are realized as metal oxide nitride compounds.

Characteristic for the behavior of a D/M/D system is that the requested transmission within the visible spectral range may only be reached by suppression of the reflection of the metallic layer. Thereabout, we again refer to (1). This is only possible for a narrow wave length range, and light which is transmitted through the D/M/D system is there significantly absorbed too. Thereby, especially the following two drawbacks result:

with increasing thickness of the metal layer the absorption in the visible reflection-suppressed spectral range as well as the reflection in the infrared range rise. This leads to the fact that the metal layer thickness is not freely selectable, but must be tailored so that the transmission in the visible spectral range still reaches the requested value of e.g. 75%. If a higher transmission is to be reached in the visible spectral range, this automatically leads to a lower infrared reflection and thus to a lower sun protection effect.

The suppression of reflection in the visible spectral range has a so-called "V characteristic", which means that the reflection is minimal at a specific wave length, risen significantly towards shorter and towards higher wave lengths. Because sensitivity of the human eye is maximum in the green spectral range the reflection minimum is realized in the green spectral range so as to be able to realize maximum metal layer thickness, which, on the other hand, leads to most efficient blocking of the near infrared. Thereby, there results necessarily a reflection which appears bluish/reddish, i.e. lilac. Every variation of the reflection color, which may be desired especially due to aesthetic aspects—relevant when looking at a window from the outside, because here a bright surrounding is reflected in the window, the background thereof—the inside of the car—being relatively dark—, may only be realized in deficiency of the protection effect with respect to near infrared radiation. Attention is lead on the U.S. Pat. No. 4,965,121 where a D/M/D system is proposed, the reflection color thereof being from neutral to bluish. According to the examples disclosed therein one may understand that there is a trade-off between color neutrality and sun radiation protection.

Further, D/M/D systems are electrically conductive. This has the advantage that e.g. an electrically heatable window or a so-called "low emissivity" window or screen may be realized (low emission coefficient in the far infrared, so that the energy loss by heat radiation in the room temperature range is reduced). This nevertheless has the significant drawback that a window provided with a D/M/D system becomes impermeable to electromagnetic frequencies, which are necessary for operating infrared remote controls, radio, mobile phones, GPS etc. in the car or out of the car. Additionally, it is considerably more difficult to realize so-called "aerial windows", at which aerials or antennas are integrated into the composite window because by using a D/M/D system respective surface areas of the window must be masked out from coating or possibly at the compounding process, which leads to a considerable additional effort.

SUMMARY OF THE INVENTION

Departing from a composite glass with a sun heat protection coating embedded therein which coating comprises dielectric layers, it is an object of the present invention to provide for such composite glass, which does not block electromagnetic signals and with which e.g. aerial windows may be easily realized and at which the color appearance may be flexibly selected, especially at preferred embodiments, at which the coating is stable with respect to influences from surrounding, which, especially in a preferred form of realization, is low-cost in manufacturing and may be realized with flexibly variable coatings, which realizes with respect to sun protection an efficient separation of transmission in the visible spectral range and reflection in the near infrared spectral range, which especially in preferred embodiments maintains the advantages of foil-relayed systems with respect to glass systems (see below).

This is realized by a composite glass at which the coating is realized exclusively by dielectric layers. Especially there is thereby realized a coating which is not electrically conductive.

Although in a preferred embodiment of the inventive compound glass, at least a part of the dielectric layers which form the coating, and as will be explained later, are deposited on a plastic foil, thereby preferably on a PET foil, it is absolutely possible and in the range of the present invention to provide no such plastic foil and to apply the inventively provided coating e.g. composed of coating parts on one or on two or even on more than two glass layers forming the composite glass.

Preferably, the reflection maximum is selected at a wave length $\lambda$ for which there is valid 800 nm $\leq \lambda \leq$ 1100 nm, thereby preferably 850 nm $\leq \lambda \leq$ 1000 nm.

Further, the coating preferably comprises at least one layer system with at least one high refractive layer and at least one lower refractive layer, whereby there is valid for the refractive index of the material of the higher refractive layer, $n_H$ preferably:

$n_H \geq 2.40$, preferably $n_H \geq 2.45$, and even more preferred $n_H \geq 2.55$ and there is valid for the refractive index of the material of the lower refractive layer, $n_L$:

$n_L \leq 1.7$, preferably $n_L \leq 1.50$, all those values measured at light with $\lambda=550$ nm.

Further, the packaging density of the coating material is preferably at least 95%, preferably even at least 97%. This packaging density is referred to the density of these materials in bulk form.

Further, and preferably the coating is X-ray amorphous. Still further the spectral temperature shift e.g. of the transmission spectrum of the coating is at most 0.5% in the temperature range between 20° C. and 120° C. Preferably there is used as material of at least one high-refractive layer at least one material out of the group consisting of oxides or oxinitrides of Ti, Ta, Hf, Zr, Zn, thereby especially preferred $TiO_2$.

As material of the at least one lower refractive layer provided at the coating there is preferably applied at least one material of the following group: $SiO_x$, SiON, $SiO_2$, thereby especially preferred $SiO_2$.

Purely dielectric layers are known as substantially absorption-free in the visible spectral range. With the application of e.g. $SiO_2/TiO_2$ layer systems absorption values of the entire layer system of less than 3% are fairly common. For sun protection systems a low absorption is not absolutely necessary, because e.g. according to the ECE standard No. 43 the transmission of a front window of a vehicle in the visible spectral range must be not more than 75% and of another vehicle window only at least 70%. Therefore, so as to reach an optimum sun protection effect it is meaningful to either reflect or to absorb the remaining 25% or 30% of visible sun radiation respectively if thereby the spectral separation ability of the system is improved. Therefore, it is proposed that the coating comprises in the visible spectral range an absorption of more than 3%, preferably of substantially more.

By the fact that considerable absorption values may be admitted in the visible spectral range, considerably higher coating rates may be applied during manufacturing of the inventive composite glass, as an increased coating rate customarily leads to an increase of the resulting layer absorption. Further, and based on the same reason, materials may be used which have a higher index of refraction $n_H$, which in praxis is mostly linked to an increased absorption coefficient. Thus, as a material of at least one high-refractive layer of the coating, it is absolutely possible to use HfON or another oxinitride of Ti, Ta, Zr etc. with refractive indexes of up to 2.8 or even higher.

If the coating at the inventive composite glass is applied to one or on both glass substrates, this is insofar disadvantageous, that, in the case where the coating is applied first to flat glass, this glass, e.g. of a car window, is too early costly redefined in the manufacturing process, so that waste material during following manufacturing steps, as e.g. cutting waste, waste due to misfunction during a bending process of the window, waste at manufacturing the compound structure etc., are most effective with respect to wasted costs. Besides of that, bending which e.g. has to be performed in manufacturing car windows and of pre-coated glass leads to a high temperature loading (>600° C.) of the already applied coating, which may lead to problems with respect to adhesion of such coating and which may change the optical characteristics of the coating. We refer thereabout to the EP-0 307 578 with respect to bendable D/M/D systems on flat glass. On the other hand there results from coating of definitely shaped glass substrates that coating and handling processes must be provided tuned to a multitude of differently shaped substrates. Coating of pre-bent glass further increases the complexity of manufacturing, because then coating thickness homogeneity must be tuned with respect to the different curvatures of the glass.

Therefore, in a preferred embodiment of the inventive composite glass, there is provided an embedded plastic foil to which at least a part of the layers which form the coating are applied.

Thereby, all the drawbacks discussed above with respect to D/M/D systems and additionally all the drawbacks of systems with coated glasses—all problems which are commonly known to the skilled artisan—are resolved in a surprisingly simple manner.

A preferred inventive composite glass comprises two outer glass substrates—or two structures of glass substrates, at which a ballistic glass substrate may be provided—and at least one coated foil applied therebetween. Thereby and preferably the one of the glass substrates is provided of green glass, the other glass substrate of clear glass. Preferably the inventive composite glass is especially construed as defined in claim 14.

An inventive composite glass fulfils preferably the following criteria, separately or, and preferred, in combination:

a) $E_{SUN} \leq 65\%$,
preferably
$E_{SUN} \leq 60\%$.
b) $T_{VIS} \geq 70\%$,
preferably
$T_{VIS} \geq 75\%$.
c) $T_{SUN} \leq 55\%$,
thereby preferably
$T_{SUN} \leq 50\%$.
d) $R_{SUN} \geq 20\%$,
preferably
$R_{SUN} \geq 23\%$.

Further and according to the invention, the inventive composite glass is proposed as a part of a window, preferably of a vehicle window as of a car-, aeroplane- or train-window, there is further proposed an inventive manufacturing process for a coated plastic foil, especially for manufacturing an inventive composite glass. Thereby and under economic aspects optimum high coating rates were achieved by using magnetron sputtering, thereby especially using DC magnetron sputtering. Nevertheless, this does not exclude that non reactive sputtering as especially Rf sputtering, sputtering with applying DC and superimposed AC or sputtering with pulsating DC voltage or with AC may be applied for the inventive manufacturing of the foil. Thereby, and with respect to reactive sputter coating of dielectric layer materials we draw the attention especially on the EP-A-564 789, the U.S. application Ser. No. 08/887 091 respectively, and with respect to choppered DC sputtering of dielectric layer materials especially on the EP-A-508 359, the U.S. Pat. No. 5,292,417 respectively.

BRIEF DESCRIPTION OF THE DRAWINGS

The invention will now be described by means of examples, results and further figures. The figures show.

DESCRIPTION OF THE PREFERRED EMBODIMENTS

The inventively applied coating, embedded into the composite glass a dielectric layer system, is applied with all its layers to one or to the other glass substrates or is applied to one part to the one and to the other part to the other of the glass substrates. The coating mentioned is nevertheless preferably applied to a plastic foil, preferably a PET foil, whereby, here too, some layers of the inventively provided coating may selectively be applied directly onto one and/or the other of the glass substrates as well as to one or to both sides of the foil, which foil being applied between the glass substrates. Further, the glass substrates which follow up the coating towards the exterior may be realized by means of a more or less complex sequence of different glasses. Further, there may possibly be applied two or more than two of the said coatings. At least one of the glass substrates mentioned may be formed by ballistic glass or may comprise such ballistic glass.

The coating further preferably comprises a sequence with at least one layer of high-refractive material H and at least one subsequent layer of lower refractive material L. The inventively provided coating thus results e.g. in a layer sequence:

(H, L)$_x$, H or H (H, L, H)$_x$, H whereby there is valid x=1, 2, 3 or even more.

The single layers H, L are approximately $\lambda/4$ layers, whereby—for the manufacturing a most important aspect—the requested layer thicknesses may vary from $\lambda/4$ by up to ±15% without resulting in substantial variations of the optical characteristics of the inventively provided coating, namely high reflection in the near infrared spectral range and high transmission in the visible spectral range. But, on the other side, one can influence especially the color appearance of the reflections and thereby the optical appearance of the composite glass by flexibly varying the layer thickness within the range of the thickness variation just stated without substantially influencing the optical reflection and transmission behavior.

Figure 2:
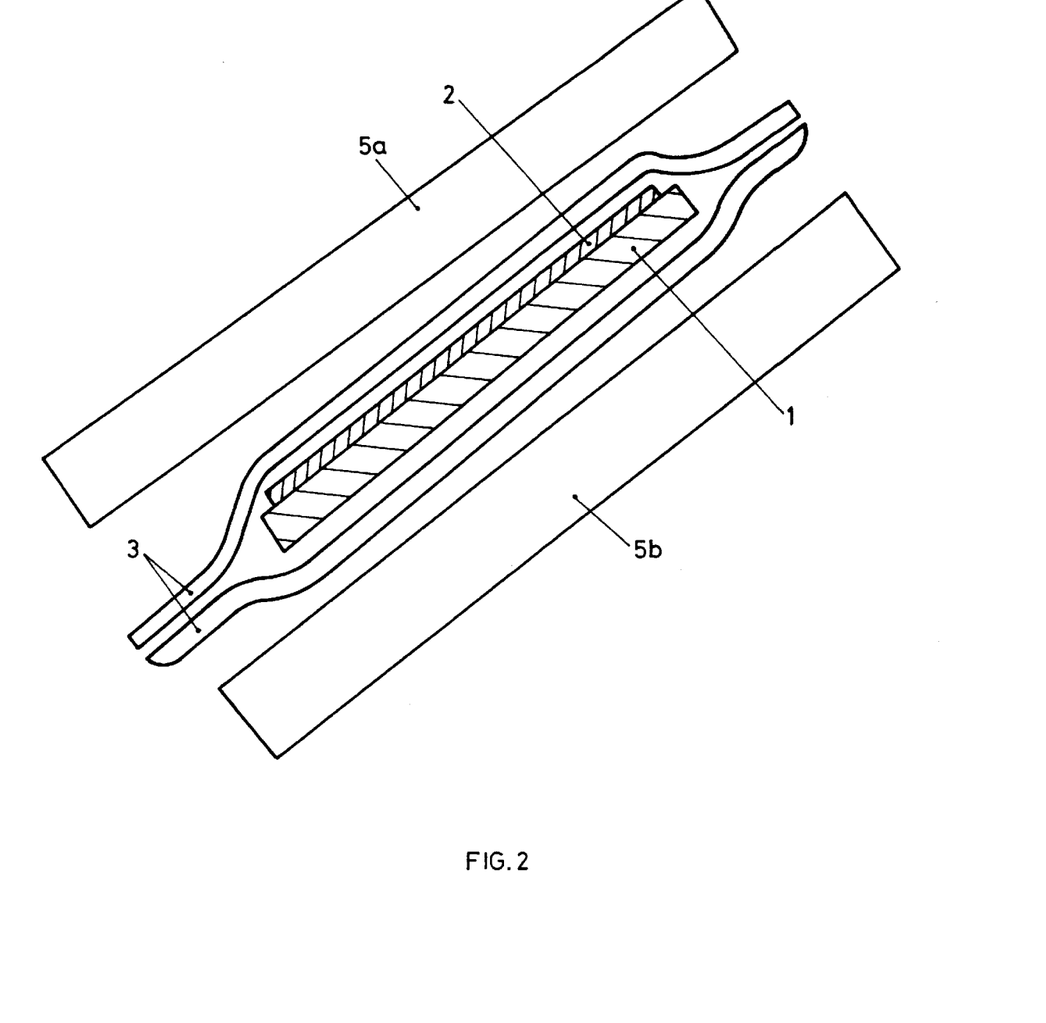
FIG. 2 is, a schematic representation through an inventive composite glass in a preferred embodiment.

In FIG. 2 there is schematically shown a cross-section through an inventive composite glass in a preferred form of realization. Between two glass layers 5a and 5b, which each, as was mentioned, may be formed by a complex sequence of different glasses, there is embedded between two foils 3, preferably PVT foils, a coating carrier foil 1, preferably made of PET (Polyethylen Terephtalate). On that foil there is provided the inventive coating 2, preferably starting with a layer of higher refractive material.

As was mentioned, in FIG. 2 there is shown a preferred embodiment of the inventive composite glass. In the following examples the layers forming the coating 2 according to FIG. 2 on the PET foil 1 were designed for a wave length of approx. 950 nm.

Thereby, for applying the coating reactive DC magnetron sputtering was used. With respect to the coating method the EP-A-508 359 and the U.S. Pat. No. 5,292,417 shall be an integral part of the present description.

The following layer materials were applied:

H: TiO$_2$, typically n$_H$=2.45

L: SiO$_2$, typically n$_L$=1.47

1. EXAMPLE

Design (layer thickness in nm): PET foil/49 nm TiO$_2$ (49 nm TiO$_2$, 166 nm SiO$_2$, 49 nm TiO$_2$)$_x$, 49 nm TiO$_2$, with x=1, 2, 3.

Thereby, as shown, all L layers had the same thickness and so did all the H layers. This results in considerable advantages for manufacturing and especially for controlling the coating process.

The coated PET foil was, as schematically shown in FIG. 2, especially for manufacturing car windows, embedded between an inner glass 5b of green glass and an exterior glass 5a of clear glass. In Table 1 the results for examples No. 1 are shown. It is evident that with rising value of x the sun heat protection number E$_{SUN}$ becomes smaller as desired, that nevertheless the respective improvement when changing from x=1 to x=2 is significantly larger than it is when changing from x=2 to x=3.

| Example | CIE coord. X under 45° | CIE coord. Y under 45° | R (VIS) under 45° | T (VIS) under 0° | T (SUN) under 0° | R (SUN) under 0° | A (SUN) under 0° | E (SUN) T + A/2 |
|---|---|---|---|---|---|---|---|---|
| clear glass | 0.313 | 0.329 | 9.8% | 91.8% | 88.7% | 7.9% | 3.4% | 90.4% |
| green glass | 0.307 | 0.331 | 8.5% | 79.8% | 57.2% | 5.7% | 37.1% | 76% |
| 1 x = 1 | 0.332 | 0.293 | 10.9% | 76.5% | 48.4% | 23.9% | 27.7% | 62% |
| 1 x = 2 | 0.308 | 0.288 | 11.8% | 76.5% | 46.3% | 28.6% | 25.1% | 59% |
| 1 x = 3 | 0.311 | 0.263 | 11.9% | 76.5% | 45.4% | 30.7% | 23.9% | 57% |
| 2 | 0.309 | 0.322 | 11.6% | 75.3% | 46.5% | 31.6% | 21.9% | 58% |
| US 4965121 Example 3 | 0.288* | 0.280* | | 75.0% | 47.0% | 30.0% | 23.0% | 59% |
| ideal glass | | | | 75.0% | 37.3% | 50.0% | 12.7% | 44% |

* in U.S. Pat. No. 4 965 121 not explicitly mentioned, calculated according to the design disclosed therein.

Figure 3:
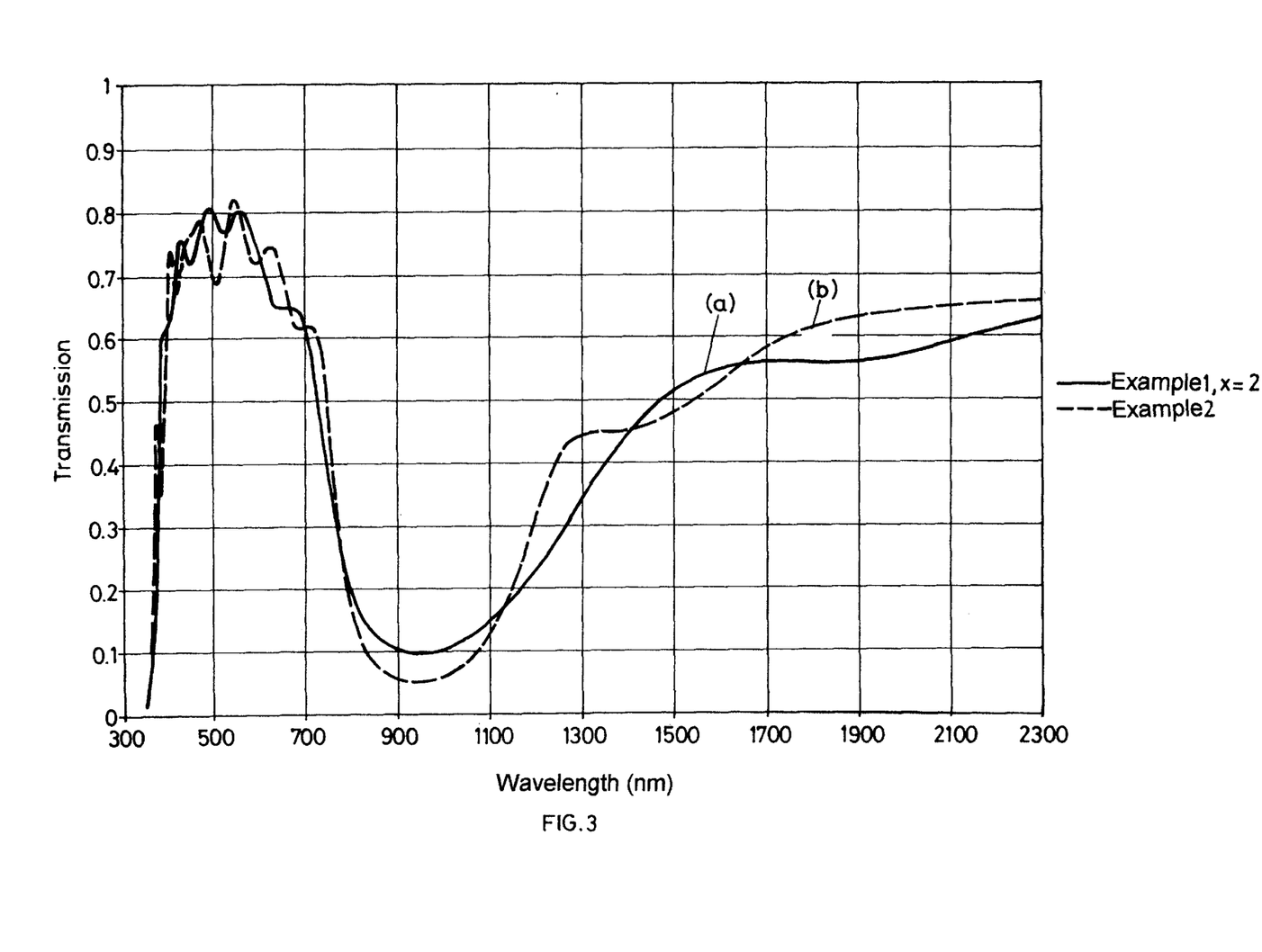
FIG. 3 is a graph showing two spectral transmission courses according to the examples to be described, at light impinging perpendicularly.

In FIG. 3 there is shown the transmission course (a) for x=2, i.e. with the structure H(H, L, H)$_2$.

2. EXAMPLE

Design: 102 nm TiO$_2$, 177 nm SiO$_2$, 92 nm TiO$_2$, 171 nm SiO$_2$, 88 nm TiO$_2$, 178 nm SiO$_2$, 93 nm TiO$_2$.

Again a PET foil was coated by means of DC magnetron sputtering. The inner glass 5b was green glass, the exterior glass 5a was clear glass. FIG. 3(b) shows the resulting transmission course.

Further, in Table 1 there is shown for the listed examples 1, 2 the CIE coordinate values for standard light D65 and the sun protection numbers (CIE coordinates and standard light D65 according to DIN 5033). For comparison the respective characteristic parameters of normal clear glass and of green glass as well as of a D/M/D protection system based on silver and according to example 3 of the U.S. Pat. No. 4,965,121, and further of "ideal glass" are listed. The CIE coordinate values of the D/M/D system according to the mentioned U.S. Pat. No. 4,965,121 were calculated on the basis of the design disclosed in that patent.

Figure 4:
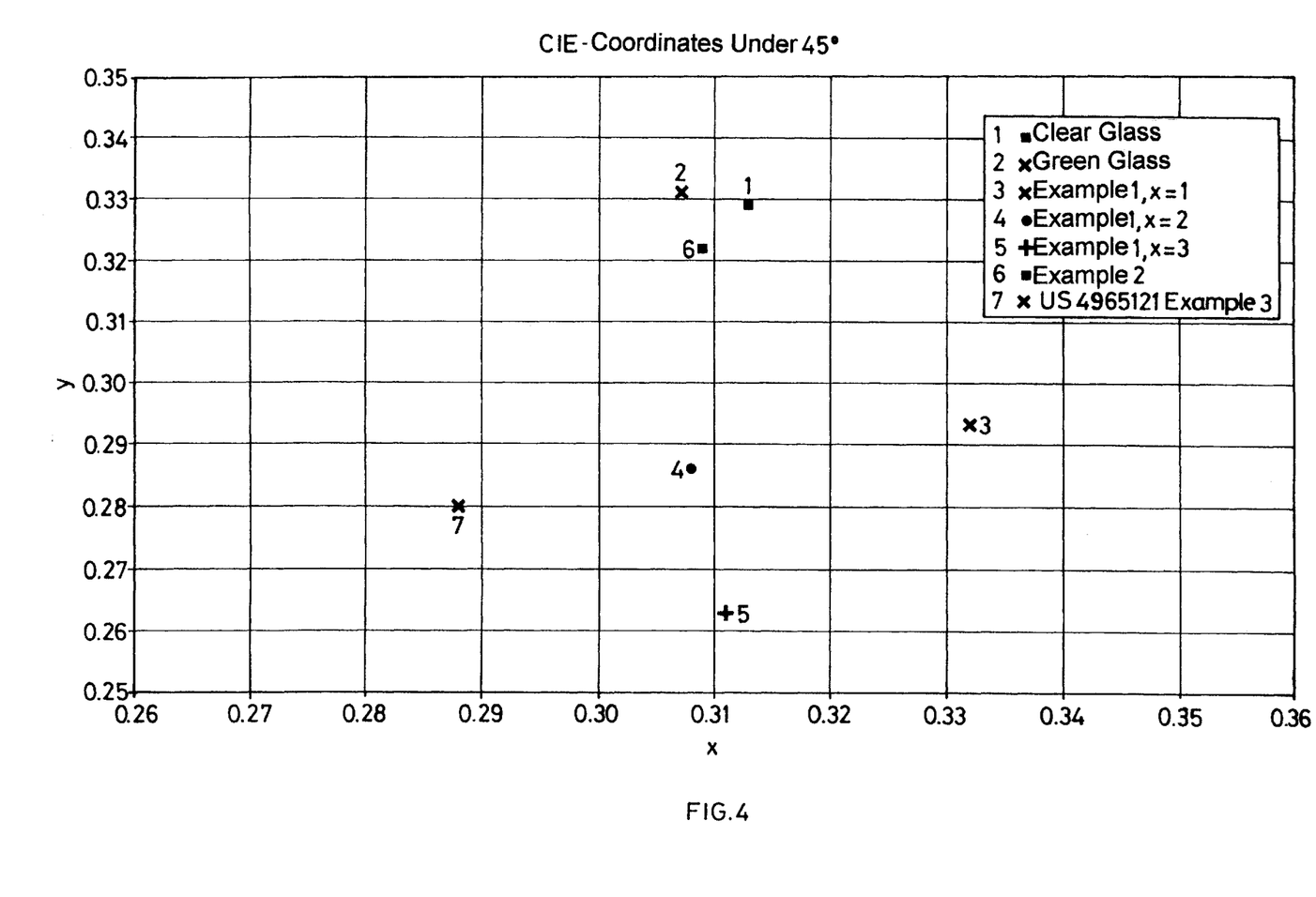
FIG. 4 is a diagram of the CIE coordinate values for standard light D65 under a viewing angle of 45° in reflection.

In FIG. 4 the CIE coordinate values for clear glass, green glass, example 1 with x=1, 2, 3, example 2 and, calculated for the D/M/D system according the U.S. Pat. No. 4,965, 121, example 3, are shown for reflection under 45° and for viewing from the exterior side (5a).

The reflection in the visible spectral range may be adjusted by means of the dielectric layer system and this practically independent of the reflection in the near infrared. The two examples lead to a "medium-scale" reflection in the visible spectral range of approx. 12%, whereby approx. 9% is due to reflection at the two glass/air interfaces, and approx. 3% is due to the layer system. The skilled artisan may simply modify the layer system so that e.g. by reducing the thickness of the outermost H layer a "high" reflection of e.g. >20% is reached in the visible spectral range, or that e.g. by introducing of matching layers between the λ/4 layer packet and air surrounding a "low" reflection is achieved, e.g. <10%, which is then composed of 9% reflection of the glass/air interfaces and <1% reflection of the layer system.

It is preferred to realize a medium-scale reflection because at a too low reflection the reflection color reacts more sensitively on angular deviations and is more difficult to reproduce. A high reflection of the surrounding leads, e.g. of the instrument board of a car at a car window, to very irritating reflections.

An according absorption in the visible spectral range may be reached by means of the glass as desired in that e.g. exclusively or partially green glass is used. It is especially preferred to realize the exterior glass at an inventive car window of clear glass, the inner glass, exposed to the interior of the car, of colored, absorbing glass, thus e.g. of green glass. Because the absorbed light also adds to heating up, according to the sun protection number $E_{SUN}$, it is optimal if the sun radiation first penetrates the clear glass, which is low-absorbing, then impinges on the reflective coating, and only the not-reflected part of the radiation is partly absorbed by the inside green glass. As an optimum the thickness of the absorbing glass is selected so that the transmission in the visible range just suffices the minimum values requested, thus for car windows of e.g. 75%.

It may be seen from Table 1 that the sun protection effect according to number $E_{SUN}$ is comparable with that of D/M/D systems on silver basis, whereby, and as was mentioned above, there are inventively gained considerable advantages. This especially because the inventive layer system is purely dielectric, thus electrically non-conductive, so that e.g. realization of aerial windows and the operation of remote controls, telephones etc. are possible by or through the inventive composite glass or the inventive car window. Because absorption in the visible and reflection in the infrared are mutually independent at the inventive composite glass, the absorption of the composite glass may flexibly be adjusted in the visible spectral range between 50% up to below 1% at unchanged reflection in the near infrared, whereas at a D/M/D system a lower absorption in the visible spectral range always results in a reduced reflection in the near infrared. Whereas according to FIG. 4 a D/M/D system featuring a good number $E_{SUN}$ always leads to a bluish-lilac-reddish color impression, the dielectric system on the inventive foil may be optimized with an unchanged number of layers of the coating either in the bluish-lilac-reddish area (see example 1 with x=3) or may be optimized in the neutral/greenish area (see example 2) without substantially affecting the number $E_{SUN}$. This "degree of freedom for color" is a considerable advantage because thereby e.g. car windows may be designed not only according to their functional target, but also under consideration of appearance aspects.

Because especially by means of reactive DC magnetron sputtering there is used a cold coating process, it is absolutely possible to coat plastic foils on a large industrial scale. In a foil coating plant, a so-called "roll coater", there is unrolled an endless foil from a roller and is conveyed past a coating source and is then rewound on a roller. In opposition thereto and for coating flat glass substrates, customarily in "in line" plants, a large volume of substrates must be handled and must be led through a vacuum chamber. Thus, a glass coating process or respectively such an "in line" plant is of much higher effort than a foil coating plant, also considering maintenance and repair, and especially considered per unit of surface being coated. Thus, there result for the preferred embodiment of the inventive composite glass with a coated plastic foil further considerable advantages.

What is claimed is:

1. A composite glass with a sun heat protective coating embedded therein, comprising at least two glass layers, a plastic material foil embedded between said glass layers, said sun heat protective coating being applied to said plastic material foil and consisting essentially of dielectric layers and having a reflection maximum for light of a wave length λ at 780 nm ≦ 1200 nm and a transmission maximum for light of a wavelength λ at 380 nm ≦ λ ≦ 780 nm.

2. The glass of claim 1, wherein said reflection maximum is at:

800 nm ≦ λ ≦ 1100 nm.

3. The glass according to claim 1, wherein said coating comprises a layer system of at least one layer of high-refractive material and comprises at least one layer of lower refractive material, whereby for the index of refraction $n_H$ of said high-refractive material there is valid:

$n_H \geq 2.40$, considered at a wavelength λ=550 nm and for the refractive index $n_L$ of the lower refractive material there is valid:

$n_L \leq 1.7$, at a wavelength λ of 550 nm as well.

4. The glass according to claim 1, wherein with respect to the density of the material used for said coating and in bulk form the package density of the coating material is at least 95%, preferably at least 97%.

5. The glass according to claim 1, wherein said coating is X-ray amorphous.

6. The glass according to claim 1, wherein a temperature drift of the spectral behavior of said coating is at most 0.5% within a temperature range between 20° C. and 120° C.

7. The glass according to claim 1, wherein the coating comprises at least one layer package with at least one layer of a high-refractive index material and at least one layer of a lower refractive index material, wherein the high refractive index material is an oxide or oxynitride of a metal selected from the group consisting of Ti, Ta, Hf, Zr and Zn.

8. The glass according to claim 1, wherein said coating comprises at least one layer package with at least one layer of high-refractive index material and at least one layer of a lower refractive index material, wherein the lower refractive index material is at least one material selected from the group consisting of $SiO_x$, $SiO_N$ and $SiO_2$.

9. The glass according to claim 1, wherein the absorption of said coating and within the visible spectral range is at least 3%.

10. The glass according to claim 1, wherein coating layers of equal material are of equal thickness with a tolerance of ±15%.

11. The glass according to claim 1, wherein said glass comprises layers of different glasses.

12. The glass according to claim 1, wherein it is a ballistic composite glass.

13. The glass according to claim 1, wherein it comprises an embedded foil and is, at least one of PVB and PET.

14. The glass according to claim 1, wherein the glass is part of a vehicle window.

15. The glass according to claim 1, wherein the glass is bent.

16. The glass according to claim 1, wherein for light impinging perpendicularly there is valid:
$E_{SUN} \leq 65\%$.

17. The glass according to claim 1, wherein for light impinging perpendicularly there is valid:
$R_{VIS} \leq 13\%$.

18. The glass according to claim 1, wherein for light impinging perpendicularly there is valid:
$T_{VIS} \geq 70\%$.

19. The glass according to claim 1, wherein for light impinging perpendicularly there is valid:
$T_{SUN} \leq 55\%$.

20. The glass according to claim 1, wherein for light impinging perpendicularly there is valid:
$R_{SUN} \geq 20\%$.

21. A method for producing a composite glass with a coated plastic foil, comprising: providing at least two glass layers, applying a coating consisting essentially of at least one dielectric layer to a plastic material foil by sputtering, said coating having a reflection maximum for light of a wavelength $\lambda$ at
    780 nm $\leq \lambda \leq$ 1200 nm
and a transmission maximum for light of the wavelength $\lambda$ at
    380 nm $\leq \lambda \leq$ 780 nm,
and embedding the coated foil between the glass layers.

22. The method of claim 21, wherein said coating is applied by reactive sputtering.

23. The method according to claim 21, wherein said sputtering is performed by one of DC with superimposed AC, pulsating DC, AC up to the Rf range, magnetron sputtering, DC sputtering, or DC magnetron sputtering.

24. The method according to claim 19 wherein the foil is made of PET.

25. The glass according to claim 1 wherein one of said at least two glass layers in clear glass and the other of said at least two glass layers is colored glass.

* * * * *